United States Patent
Johnson (10) Patent No.: US 8,791,793 B2
(45) Date of Patent: Jul. 29, 2014

(54) SYSTEMS AND METHODS FOR IDENTIFYING PROCESS MOLDED PARTS

(71) Applicant: Palo Alto Research Center Incorporated, Palo Alto, CA (US)

(72) Inventor: David Johnson, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 90 days.

(21) Appl. No.: 13/665,922

(22) Filed: Oct. 31, 2012

(65) Prior Publication Data

US 2014/0118106 A1     May 1, 2014

(51) Int. Cl.
*G05B 19/00* (2006.01)
*G06C 7/10* (2006.01)

(52) U.S. Cl.
USPC ............................... 340/5.86; 235/141

(58) Field of Classification Search
USPC ............... 340/5.8–5.86; 235/375; 385/141
See application file for complete search history.

(56) References Cited

U.S. PATENT DOCUMENTS

| | | | |
|---|---|---|---|
| 8,049,594 B1* | 11/2011 | Baranowski | 340/5.61 |
| 8,505,810 B1* | 8/2013 | Johnson | 235/375 |
| 2008/0310700 A1* | 12/2008 | Fukusawa et al. | 382/141 |
| 2010/0284531 A1* | 11/2010 | Hohberger et al. | 380/22 |
| 2012/0104660 A1* | 5/2012 | Disawal et al. | 264/494 |

FOREIGN PATENT DOCUMENTS

FR     2907288 A1 *  4/2008  ................ H04L 9/32

* cited by examiner

*Primary Examiner* — Hai Phan
*Assistant Examiner* — Royit Yu
(74) *Attorney, Agent, or Firm* — Ronald E. Prass, Jr.; Prass LLP (57) ABSTRACT

A system and method are provided for reading and identifying molded products based on detecting intentionally introduced defects in the molded products that were included to identify and authenticate the molded products, or to confirm compatibility of the molded products in devices in which the molded products are installed for use. Process conditions in the fabrication or formation of melt processed parts are modified to deliberately introduce surface, detectable defects into the melt processed parts. A Quality Review (QR) code that specifies a compilation of at least some of the actual defects that are present in the molded part is provided, potentially encrypted, for comparison purposes.

20 Claims, 4 Drawing Sheets

SYSTEMS AND METHODS FOR IDENTIFYING PROCESS MOLDED PARTS

This disclosure is related to U.S. patent application Ser. No. 13/665,924, entitled "SYSTEMS AND METHODS FOR ADDING AUTHENTICATING FEATURES TO PROCESS MOLDED PARTS AND THE RESULTANT MOLDED PARTS," filed on a same day as this application, and the disclosure of which is hereby incorporated by reference herein, in its entirety.

BACKGROUND

1. Field of the Disclosed Embodiments

This disclosure relates to systems and methods for uniquely identifying and authenticating process molded products, and/or confirming compatibility of process molded replacement component parts in devices in which the process molded replacement component parts are installed for use, based on comparing intentionally introduced defects in the process molded products with identification information provided on the process molded products.

2. Related Art

All manner of image forming devices make use of consumable products, such as inks and toners, and otherwise include customer replaceable components or units, many of which are routinely replaceable based on a limited service life. In the latter instance, the service life of a particular customer replaceable component or unit may be tracked and measured, for example, according to a number of image forming operations that the customer replaceable component or unit may undertake. Depending on a level of sophistication in the image forming device, a customer or end-user may be provided feedback regarding a condition of a limited-service-life customer replaceable component or unit, or a remaining level of a particular consumable in the image forming device. Customers and end-users may be provided with alerts to warn them regarding an impending end-of-service-life condition for a customer replaceable component or unit, or a pending exhaustion of a particular consumable in the image forming device.

Companies that manufacture and sell image forming devices generate substantial post-sale revenue from the separate business of selling replacement components to the customers and end-users to which they have previously sold the image forming devices. Based on the significant revenue that may be available in the marketplace for replacement consumables, recent years have witnessed a significant growth in companies whose sole business is to manufacture, remanufacture, refurbish, refill, or otherwise produce counterfeit or copies of (often referred to as "gray" market) replacement consumables for use in other companies' image forming devices. The steep increase in the growth of companies manufacturing and selling "gray" market components adversely affects the companies that manufacture and sell the image forming devices for customers and/or end-users. There are measurable economic effects based on the loss of revenue from the customers and/or end-users purchasing replacement consumables from sources other than the image forming device manufacturers, or those authorized and licensed by the device manufacturers. More subtle, however, are the intangibles such as the potential for an impact on the reputation of the image forming device manufacturer in instances where, for example, specific users experience poor image quality for images produced on a particular image forming device without recognizing that the fault may lie not with the image forming device itself, but rather with the quality of the less-than-optimally-compatible replacement consumables that have been procured from other sources and installed in the image forming device.

The companies that manufacture and sell image forming devices to customers and end-users, therefore, have a significantly vested interest in attempting to combat the use of "gray" market replacement consumables in their image forming devices. In order to combat the proliferation of "gray" market components, device manufacturers are taking affirmative steps to address the issue. The schemes employed by the image forming device manufacturers may include contractual schemes such as specifically warning their customers and/or end-users that the use of non-company manufactured replacement consumables in a particular image forming device will invalidate any warranty protection on the image forming device. There will remain, however, customers and/or end-users that are willing to accept voiding the warranty as a trade-off for potential cost savings and other incentives that may be associated with procuring and using "gray" market replacement consumables.

Industries that manufacture machinery of all types, including companies that manufacture and sell image forming devices, employ myriad strategies to "mark" the authorized and compatible replacement components and consumables that they produce in ways that are designed to thwart the efforts of producers and consumers of counterfeit or copied products. These strategies often include mechanisms by which the replacement consumables and the devices into which they are installed are made to "communicate" with and the devices are programmed to "recognize" only authorized and compatible replacement components produced by, or under a license with, the device manufacturer. For example, extensive beneficial use is made of capabilities to externally monitor operating conditions of myriad customer replaceable components or units, and consumables via the containers in which the consumables are provided, in all manner of devices and systems with which the customer replaceable components and units and/or consumables are associated. Externally or remotely electronically-readable monitoring modules associated with the customer replaceable components or units, or consumables containers, may provide a monitoring function for monitoring one or more characteristics of the customer replaceable component or unit, or the consumable. More advantageously, the role of these externally or remotely readable electronic data storage components has been expanded to include storing information that may be read by a device when the customer replaceable component or unit, or consumables container, is installed in the device. The "read" information may include data by which to identify the customer replaceable component or unit, or consumable, to the device and to confirm authenticity and/or compatibility of the customer replaceable component or unit, or consumable, with the device. Failure to pass certain comparison or mating tests in the device may lead the device itself to inhibit further internal operations until the situation is corrected.

Certain customer replaceable components or units, and/or consumables, may not be amenable to inclusion of externally or remotely readable electronically writeable/readable devices or modules. As such, despite the advantages of being able to provide specific identification, authentication and compatibility data in a manner that may be difficult to reproduce using this technique, other techniques may need to be exploited for certain customer replaceable components, units or consumables.

SUMMARY OF DISCLOSED SUBJECT MATTER

Many products, including customer replaceable components or units, or certain consumables, for example, solid (or phase-change) inks, are formed as or of molded components, including injection molded components. Specifically, the solid inks represent one example of the exhaustible consumables that provide a profit stream for the image forming device manufacturers or authorized suppliers, as discussed above. The molding processes afford manufacturers an opportunity to form certain of the molded products, and particularly customer replaceable components, units or consumables, in increasingly sophisticated shapes and physical configurations to provide a level of identification and authentication of the molded products as being those provided by a specific manufacturer, and/or a level of specified compatibility with a device within which the customer replaceable component, unit or consumable may be used according to a manufacturer's specifications.

Figure 1:
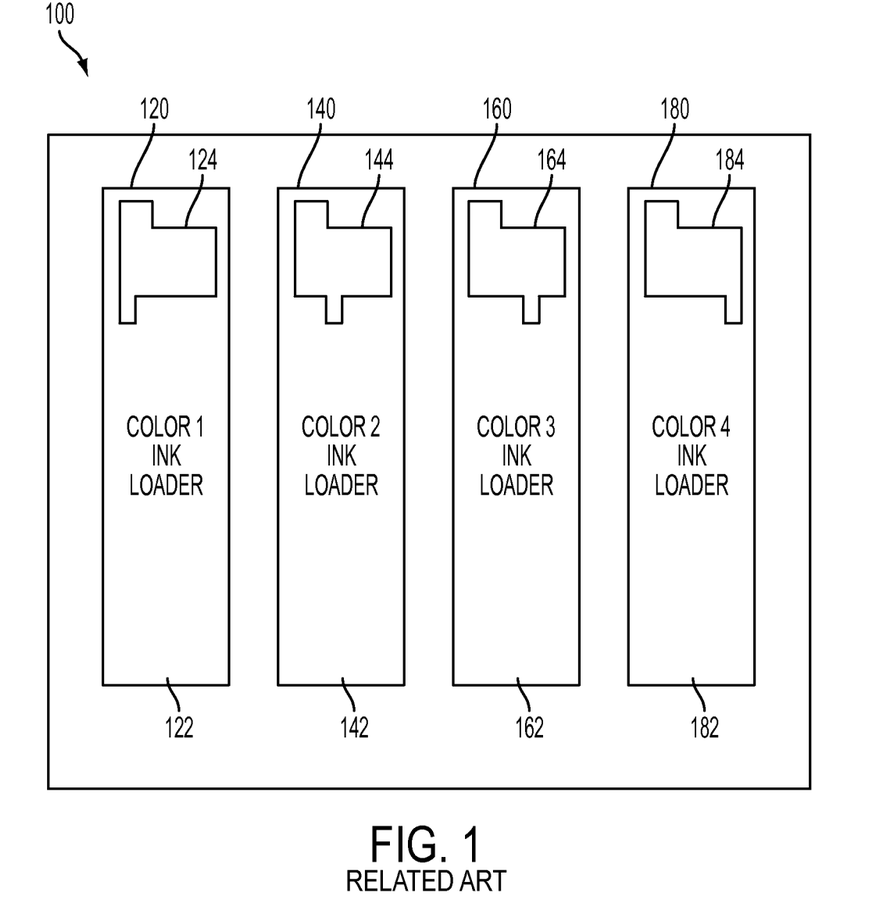
FIG. 1 illustrates a simple block diagram of an exemplary set of four (four color) solid ink element storage and supply devices with which molded products fabricated according to the systems and methods of this disclosure may be used.

FIG. 1 illustrates a simple block diagram of an exemplary set 100 of four color solid ink storage and supply devices 120,140,160,180. Each of the four solid ink storage and supply devices 120,140,160,180 consists of a color N ink loader 122,142,162,182, which includes a specifically-configured ink element insertion opening 124,144,164,184, through which the customer inserts replacement solid (often injection molded) ink elements. The specifically-configured ink element insertion openings 124,144,164,184 may be configured to allow for only the passage of a particularly-colored (configured) solid ink element with an outer physical profile that, in cross section, corresponds to only one of the ink element insertion openings 124,144,164,184. In this manner, only inks of a single color with a corresponding profile may be routinely introduced into each color N ink loader 122,142, 162,182. A first order compatibility may thus be provided by "keying" a physical configuration profile of the replacement solid ink element to a single one of the specifically-configured ink element insertion openings 124,144,164,184, comparable to a key profile for a lock, in an increasingly sophisticated manner that may be increasingly difficult to replicate.

A shortfall in the above approach, of course, is that such a technique produces products in which the configurations, even sophisticated profiles, are visually discernible and therefore are subject to counterfeiting and/or copying.

Because simple injection molded consumables often form a significant profit stream for a device manufacturer, it is highly desirable to ensure that the injection molded consumables come from only an approved source and are not copies or counterfeit products.

When creating simple injection molded products, including consumables and other melt processed parts, a variety of different production methods are used. An objective for the manufacturer in each of these processes is to create very specific shapes in a manner that produces processed components that are conventionally intended to be essentially defect free. As indicated above, often to make it more difficult for a "gray" market manufacturer or supplier to copy or counterfeit a genuine part, genuine component manufacturers, including device manufacturers, have created more and more complicated geometries to the products that they produce, including those for field use or replacement by their customers and/or end-users. While an increasing intricacy to the design of the outer molded shape of an injection molded product does indeed increase the difficulty in replicating a particular product, advances in modern equipment used to produce molded products and components has made the counterfeiting and/or copying processes significantly easier. Even an extremely complex three dimensional shape can be scanned with a laser scanner, transformed as needed and directly machined into a tool.

Those of skill in the art recognize that, when looking at several melt processed parts, subtle difference between them may be identifiable. With careful study, one may be able to tell the difference between parts that are molded from one machine or tool and another. This more sophisticated differentiation is accomplished by discerning tiny differences in the components, often in the form of minor defects that, despite efforts to avoid them, may be somewhat unavoidable based on the nature of the processes by which the components are formed, and the subtle tooling differences in the devices used to form the components. Although the net shape of a particular batch of produced molded parts may be exactly the same, the formation process, including various molding process characteristics, will inevitably, and somewhat invariably, produce defects in the produced molded parts.

A number of both upstream conditions and boundary conditions, including formulations of molding materials and characteristics of the molding processes, can be controlled that repeatably produce molded parts that have a same final shape, but resultant small differences in actual appearance based on the formation of defects resulting from the formation processes. It often requires a large amount of inside knowledge and a high skill level to detect the types of resultant small differences in actual appearance caused by defects. A service engineer, consumer or the machine within which a particular molded product may be installed for use, without being provided additional information, is unlikely to be able to tell the difference between a genuine part and a copy.

It would be advantageous to employ this generally inevitable byproduct of the forming devices and processes for molded products to the advantage of manufacturers and suppliers of the molded products, including providing advantages to manufacturers or authorized suppliers in identifying authenticity and compatibility of a particular replaceable component part, such as a consumable, for use in a particular manufacturer's or supplier's devices.

Exemplary embodiments of the systems and methods according to this disclosure may read the defects in the surfaces of molded products, including solid ink elements, in a manner that may aid in effecting identification and/or authenticity verification, and/or in specifically effecting, for example, compatibility matching in an image forming device in which the solid ink elements are intended to be used. Surface defects may have been intentionally introduced into the surfaces of the molded products by modified process conditions in the fabrication or formation of molded products to deliberately introduce surface, detectable defects into the melt processed parts.

Exemplary embodiments may visually machine-inspect the molded products to identify and authenticate the molded products for use based on knowledge of specific defects introduced into the surface of the molded products.

Exemplary embodiments may facilitate identification, authentication and compatibility confirmation for molded parts by identifying one or more deliberately introduces defects in a specific area of the molded parts. For example, undercut posts, flashes, weld lines, sinks, cracked ribs, flow marks or the like may be included individually, or in combination, in a test area on a molded part.

In exemplary embodiments, a test area on a molded part may be provided with a Quality Review (QR) code that specifies a compilation of at least some of the actual defects that are present in the molded part. The QR code may specify the parameters for evaluation of the molded part in an encrypted format. A reading device may compare the encrypted information regarding the actual defects present in a particular molded part with a scan of an intentionally defected surface of the molded part to determine identity, authenticity and/or compatibility of the molded part.

Exemplary embodiments may facilitate an image forming device, or other device with which a particular consumable may be associated, identifying, authenticating and or verifying compatibility of, the particular molded part when it is installed in the device by using, for example, a camera to take a picture of a test area of the molded part and to process provided encrypted inspection parameters. Visual machine inspection of molded parts may be according to well-established practices. Also, there are a number of known algorithms and programs that can implement an inspection scheme extremely rapidly when provided with the proper information. On the basis of the disclosed inspection and comparison scheme, an image forming device may properly accept or reject the molded product with reference to the inspection results.

Exemplary embodiments may find utility beyond image forming devices in applications in external inspection, including machine inspection, of medical device disposables (such as pipette tips in high end robotics), well plates and/or tubes for use in test equipment. Identification and authentication may be facilitated, using for example portable verification devices, of virtually all molded products made available to customers, end-users, intermediate manufacturers, assemblers, suppliers, and the like, the products including such categories as toys, product housings, components, connectors, device parts, and the like.

Exemplary embodiments may find utility in applications in other industries that are heavily reliant on molded disposables.

Exemplary embodiments may be advantageously employed in an effort to curtail adaptability and use of counterfeit or copied replacement components in devices, including image forming devices, by largely rendering the counterfeit and copied components generally incompatible with the devices, including image forming devices, that may employ them.

Exemplary embodiments may be used to curb the proliferation of all "gray" market molded components by providing a broadened basis for identification, authentication and/or compatibility verification with regard to any manner of molded products.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for intentionally introducing defects into molded products that can be used to identify and authenticate, or confirm compatibility of, the molded products, will be described, in detail, with reference to the following drawings, in which.

DETAILED DESCRIPTION OF THE DISCLOSED EMBODIMENTS

The systems and methods for intentionally introducing defects into molded products that can be used to identify and/or authenticate the molded products, and/or to confirm compatibility of molded replacement component parts in devices in which the molded replacement component parts are installed for use according to this disclosure will generally refer to these specific utilities for those systems and methods. Exemplary embodiments described and depicted in this disclosure should not be interpreted as being specifically limited to any particular configuration of a molding device, or any particular characteristics of a molding process, except that any configuration must include a molding process in which individual parameters or characteristics of the process are adjustable. The adjustments are intended to produce molded products that deviate from a known preferable defect-free configuration by intentionally introducing "readable" sets or maps of defects in the individually produced molded products and by providing corresponding legends by which to read the sets or maps of defects in the individually produced molded products. Any advantageous use of intentionally-introduced defects in molded parts employing devices and methods such as those discussed in detail in this disclosure is contemplated.

Exemplary embodiments described and depicted in this disclosure should not be interpreted as being specifically limited to any particular configuration of a surface imaging device, including but not limited to a camera or other visual imaging device, or a tactile imaging device.

Specific reference to, for example, any particular molded product, such as, for example, a solid ink component, should be understood as being exemplary only, and not limiting, in any manner, to any particular class of molded products. The systems and methods according to this disclosure will be described as being particularly adaptable to use in molding solid ink elements for use in solid (or phase-change) inkjet image forming, printing and/or copying devices. These references are meant to be illustrative only in providing a single real-world utility for the disclosed systems and methods, and should not be considered as limiting the disclosed systems and methods to any particular molded product. References to installation of a replacement molded component in a device are also meant to be illustrative and not limiting to the many varied classes of molded products that may be inspected or to the devices used to inspect those molded products. No limitation is further applied to any particular type of device in which molded products may be used. Any commonly known processor-controlled molding device in which the processor directs deviation from an optimum in the molding process that may be adapted according to the specific capabilities discussed in this disclosure, and the resultant molded components, are contemplated.

Since simple molded consumables, including injection molded consumables, are often the profit stream of an individual device platform after initial sale and/or installation of the individual device platform, it is highly desirable to ensure that replacement molded consumables only come from an approved source, such as a manufacturer, or authorized/licensed supplier, and not from copiers, counterfeiters, or gray market manufacturers. The disclosed schemes may facilitate this process with regard to molded consumables, including melt processed parts, by deliberately introducing defects into the molded consumables and then machine inspecting the molded consumables to compare a map of intentionally introduced defects with an encrypted legend that identifies, with particularity, the features of the map.

By modifying process characteristics for the production of molded products, defects in the molded products may be intentionally introduced. The potential defects in the molded parts are numerous, but there are a few common examples. Those of skill in the art will recognize certain known defects including the following. "Flash," for example, occurs when either the injection or packing pressure is too high compared to the vent size by which air is removed from the mold cavity. "Knit lines" are visible in a part when two melt flow fronts meet and do not fully merge, usually because the flow front is too cold. A part might smear and distort an undercut because of too much packing pressure in the mold. An injection speed that is too fast may result in visible flow marks on a molded part. An irregular flow or different cooling rates may lead to a warped feature. An incorrectly-sized rib could be made to crack under certain circumstances, particularly in solid ink molded products, due to comparatively large shrinkages.

Each of the above-described and/or related like defects occurs under a certain set of both processing and upstream conditions. These conditions are not easily derived from the delivered molded part. They are dependent on the physical makeup of the molding tool or device that creates the molded part, the specific composition of the mold material, and even machines that are used with the tool or device. As such, unlike with a coarsely-, or even finely-, differentiated three-dimensional geometry of the molded part, one may not be able to look at the particular molded product and easily derive the conditions under which the molded product was produced and the resulting defects resulted.

Figure 2:
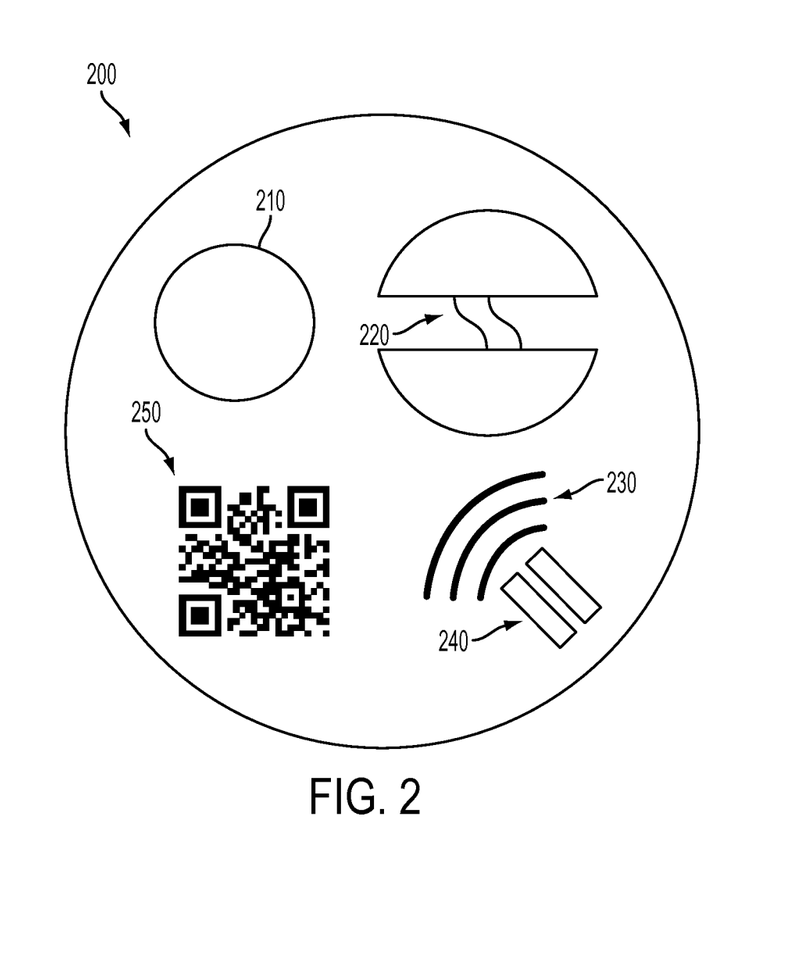
FIG. 2 illustrates an exemplary embodiment of a map of a test zone that may be provided on an intentionally defected molded product according to this disclosure.

FIG. 2 illustrates an exemplary embodiment of a map 200 of a test zone that may be provided on an intentionally defected molded product according to this disclosure. To provide authentication of the intentionally defected molded product, one or more specific defects 210-240 may be deliberately included in a specific test area of the molded product. For example, an undercut post, a flash and/or a weld line may be included in the test area. In FIG. 2, for example, illustrated examples of the one or more specific defects may include a sink 210, a cracked rib 220, one or more flow marks 230, and/or one or more weld lines 240. Those of skill in the art recognize the many potential defects and the characteristics of the molding processes that may modified to intentionally introduce such defects. The test area of the finalized molded product may also include an encrypted Quality Review (QR) code 250. The QR code 250 may be presented on labeling, in the form of an externally visually readable label such as a barcode or a glyph, or an externally electronically readable device such as an embedded active or passive radio transmission or RFID device, or other like labeling, that would specify the parameters of the intentionally introduced defects as a legend to the map of those defects on the test zone for comparison and evaluation.

When the "marked" molded product is installed in a particular device, the particular device may employ a reading unit such as, for example, a camera, to read the map of the defects in the test zone of the molded product and to compare the actually read laydown of the defect features with the encrypted information in the QR code 250 regarding those defect features. Visual machine inspection of the molded part may be according to known methods and well-established practices, as indicated briefly above. An amount of detail to be provided would be selectable according to a sophistication of the device/molded product manufacturer and a desire of the device/molded product manufacturer to protect the molded products from counterfeiting and/or copying.

Separately, a reading device with a comparable reading unit may be provided for reading the "marked" molded product apart from, or prior to, being installed in a particular device, or for reading and verifying the identity of virtually any "marked" molded product. The reading device may be a handheld or otherwise portable device, such as a smartphone, an iPhone®, an iPad®, a laptop/notebook/tablet computer, a personal digital assistant, a programmable camera, a handheld information (barcode or glyph) reader, or other like device, or a scanning or camera component associated with a larger computation system. The reading device may be virtually any programmable portable or fixed system that includes a camera or other surface imaging device that may be used to read the map of the defects in the test zone of the molded product and to compare the actually read laydown of the defect features with the encrypted information in the QR code 250 regarding those defect features. Visual machine inspection of the molded product, apart from any device or system with which the molded product may or may not be associated may be according to known methods and well-established practices, as indicated briefly above. An amount of detail to be provided would be selectable according to a sophistication of the reading device.

Figure 3:
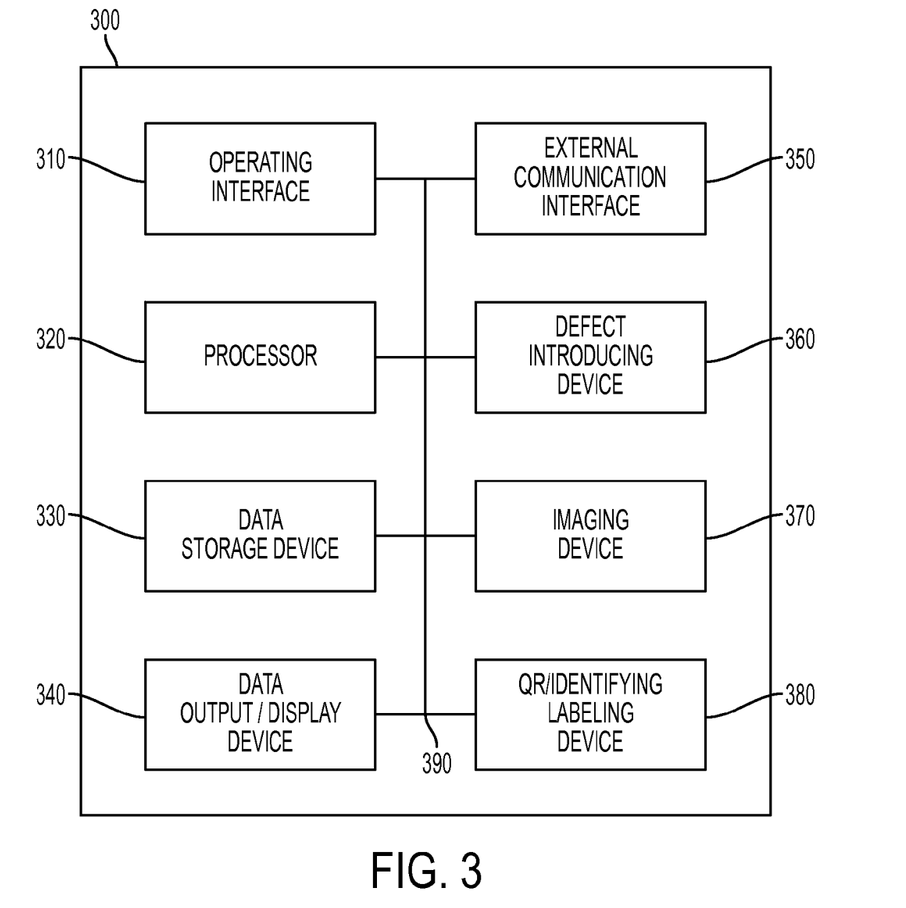
FIG. 3 illustrates a block diagram of an exemplary molded product authenticating device for effecting an authentication process based on the intentional introduction of defects into molded products via the exemplary schemes according to this disclosure.

FIG. 3 illustrates a block diagram of an exemplary molded product authenticating device 300 for effecting an authentication process based on the intentional introduction of defects into molded products via the exemplary schemes according to this disclosure. It should be recognized that the exemplary device 300, in embodiments of certain of the features described below, may be used to control a product molding device to produce a molded product according to the disclosed schemes or may be separately used to identify a molded product according to the disclosed schemes. As such, all of the component elements of the exemplary device shown in FIG. 3 may not be a part of any particular device according to this disclosure.

The exemplary device 300 may include an operating interface 310 by which a user may communicate with the exemplary device 300. The operating interface 310 may be a locally accessible user interface associated with one of a component molding device, a device for "reading" a surface of a molded product, or a device within which a molded component may be installed for use. The operating interface 310 may be configured as one or more conventional mechanisms common to control devices and/or computing devices that may permit a user to input information to the exemplary device 300. The operating interface 310 may include, for example, a conventional keyboard, a touchscreen with "soft" buttons or with various components for use with a compatible stylus, a microphone by which a user may provide oral commands to the exemplary device 300 to be "translated" by a voice recognition program, or other like device by which a user may communicate specific operating instructions to the exemplary device 300. The operating interface 310 may be a part of a function of a graphical user interface (GUI) mounted on, integral to, or associated with, the component molding device, the device for "reading" the surface of the molded product, or the device within which the molded component may be installed for use, either of which the exemplary device 300 may be associated with.

The exemplary device 300 may include one or more local processors 320 for individually operating the exemplary device 300 and for carrying out the operating functions of the defect producing and/or reading methodologies, including the producing and reading of Quality Review labeling, to include a visually readable, or electronically readable, encrypted legend of a mapping of defects on a molded product. Processor(s) 320 may include at least one conventional processor or microprocessor that interprets and executes instructions to direct specific functioning of the exemplary device 300.

The exemplary device 300 may include one or more data storage devices 330. Such data storage device(s) 330 may be used to store data or operating programs to be used by the exemplary device 300, and specifically the processor(s) 320. Data storage device(s) 330 may be used to store information regarding detected maps of defects in target zones on individual molded products in support of producing encrypted legends to compare to those maps of defects. The data storage device(s) 330 may include a random access memory (RAM) or another type of dynamic storage device that is capable of storing updatable database information, and for separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary device 300, or may be provided external to, and in wired or wireless communication with, the exemplary device 300.

The exemplary device 300 may include at least one data output/display device 340, which may be configured as one or more conventional mechanisms that output information to a user, including a display screen on a GUI of any of the supported devices indicated above or, for example, in a separate computing device in wired or wireless communication with the devices.

The exemplary device 300 may include one or more separate external communication interfaces 350 by which the exemplary device 300 may communicate with components external to the exemplary device 300. At least one of the external communication interfaces 350 may be configured as an output port for connection to, for example, any of the supported devices indicated above. Any suitable data connection in wired or wireless communication with an external data repository or external data storage device is contemplated to be encompassed by the depicted external communication interface 350.

The exemplary device 300 may include a defect introducing device 360 as a part of a processor 320 coupled to, for example, one or more data storage devices 330, or as a separate stand-alone component module or circuit in the exemplary device 300. The defect introducing device 360 may control at least one process parameter or characteristic by which at least one defect is intentionally introduced into a molded product in a molding process. The defect introducing device 360 may reference stored optimal processing conditions for the molding process that may be stored, for example, in a data storage device 330. The defect introducing device 360 may then direct that a composition of the material to be used in the molding process be modified in some manner, and/or that one or more of a temperature, pressure or time process parameter for the molding process may be adjusted in a manner that deviates from the optimal processing conditions to intentionally introduce at least one defect into the finished molded product produced by the molding process. It should be noted that there is no corresponding element in the device for "reading" the surface of the molded product or the device in which the molded product may be installed for use.

The exemplary device 300 may include an imaging device 370, which may be a camera or other like device, by which a surface of a finished molded product may inspected and by which surface characteristics, and particularly defects, may recorded, catalogued and saved for further processing. No particular configuration to the imaging device 370 is to be implied by this disclosure as it is recognized that many different devices for surface imaging, automated visual inspection and/or surface terrain mapping for a particular molded product may be used. Visual machine inspection of molded products and/or parts may be according to known and/or well-established practices.

The exemplary device 300 may include a QR/identifying labeling device 380 that may be used to produce QR labeling, which may represent, in an encrypted manner, a legend of the surface characteristics detected by the imaging device 370 when the exemplary device 300 is associated controlling a product molding device to produce a molded product according to the disclosed schemes or otherwise may be used for a comparison to detected surface characteristics detected by the imaging device 370 for use in the device in which molded product may be installed for use. The QR labeling may be in the form of an externally visually readable label such as a barcode or a glyph, or an externally electronically readable device such as an embedded active or passive radio transmission or RFID device, or other like labeling, that would specify the parameters of the intentionally introduced defects as a legend to the map of those defects on the test zone for comparison and evaluation. Whether produced in conjunction with the product molding process in the product molding device, or referenced in conjunction with a product authentication scheme by a reading device or a device into which the molded product may be installed for use, the information produced on the QR code should match the specifically-detected defect laydown, including in at least a specified test zone, on the molded product to such an extent that the comparison of the information provided with the actually imaged surface will uniquely identify the individual molded product in a manner that is very difficult, if not impossible, to for a counterfeiter to copy and/or reproduce.

All of the various components of the exemplary device 300, as depicted in FIG. 3, may be connected internally, and to one or more of the above-discussed devices, by one or more data/control busses 390. These data/control busses 390 may provide wired or wireless communication between the various components of the exemplary device 300, whether all of those components are housed integrally in, or are otherwise external and connected to either of the above-discussed devices with which the exemplary device 300 may be associated.

It should be appreciated that, although depicted in FIG. 3 as an integral unit, the various disclosed elements of the exemplary device 300 may be arranged in any combination of sub-systems as individual components or combinations of components, integral to a single unit, or external to, and in wired or wireless communication with the single unit of the exemplary device 300. In other words, no specific configuration as an integral unit or as a support unit is to be implied by the depiction in FIG. 3. Further, although depicted as individual units for ease of understanding of the details provided in this disclosure regarding the exemplary device 300, it should be understood that the described functions of any of the individually-depicted components may be undertaken, for example, by one or more processors 320 connected to, and in communication with, one or more data storage device(s) 330.

Figure 4:
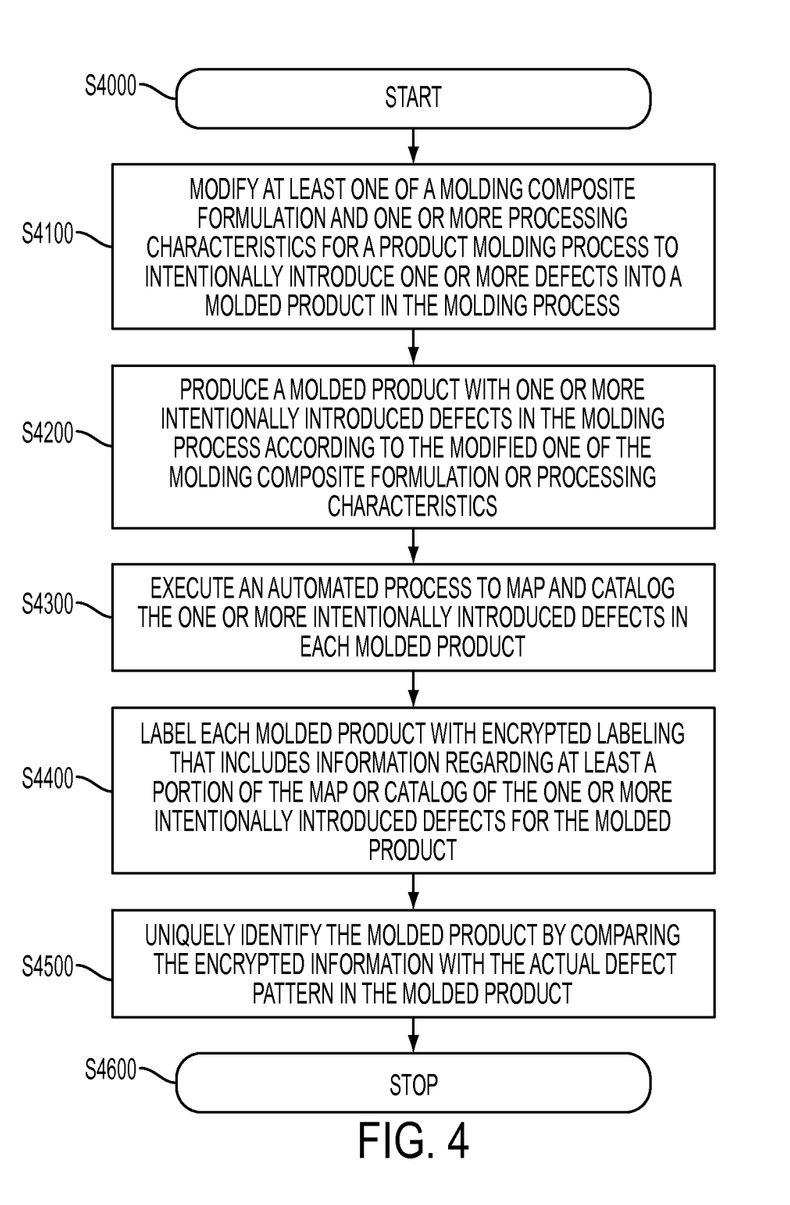
FIG. 4 illustrates a flowchart of an exemplary method for effecting authenticating of marked molded components with intentionally-introduced defects in support of a verification scheme for those molded components according to this disclosure.

The disclosed embodiments may include a method for effecting authenticating of marked molded components with intentionally-introduced defects in support of a verification scheme for those molded components. FIG. 4 illustrates a flowchart of such an exemplary method according to this disclosure. As shown in FIG. 4, operation of the method commences at Step S4000 and proceeds to Step S4100.

In Step S4100, at least one of a molding composite formulation, one or more processing parameters for producing a molded product, or one or more physical makeups of the molding tool may be modified in a manner that may intentionally introduce one or more of the above-described surface defects in the molded product. Operation of the method proceeds to Step S4200.

In Step S4200, a molded product may be produced using the one or more modified parameters in a manner that introduces surface defects into the produced molded products. The molded products may be produced according to known methods, the modified parameters intentionally introducing the defects into the surfaces of the molded products based on deviations in the process parameters from optimal process parameters that are intended to produce essentially defect free products. Operation of the method proceeds to Step S4300.

In Step S4300, an automated surface mapping process may be executed using an imaging device that may include one of a visual (camera-based) or a tactile (touch-based) map of a surface of the molded product, including particularly in a specified test zone on a surface of the molded product, to identify all or some of the defects intentionally introduced into the surface of the molded products. Operation of the method proceeds to Step S4400.

In Step S4400, each molded product may be specifically labeled with information, which may be encrypted, that may be essentially in the form of a legend related to the mapping of the intentionally introduced defects in the surface of the molded product. The labeling may be integrally formed in a surface of the molded product, or may be in the form of a separate labeling component that may be affixed to a surface of the molded product. The labeling may further be constituted as any of a visually readable label such as a barcode or a glyph, or an electronically readable device such as an embedded active or passive radio transmission or RFID device. Operation of the method proceeds to Step S4500.

In Step S4500, a molded product may be installed in a device for use. The device may image the surface of the molded product and correspondingly interpret the separate labeling. A processor unit in the device may execute an algorithm that compares (1) information regarding the surface of the molded product derived from an imaging unit in the device with (2) information, potentially encrypted, recorded on the labeling on the molded product. As a result of the comparison, the device may determine whether the molded product is at least one of authorized by, or compatible with, the device. Failure of the comparison may result in the device failing to operate, for example, based on the molded product being determined to be unauthenticated or incompatible with the device. Operation of the method proceeds to Step S4600, where operation of the method ceases.

As indicated above, the method may positively provide an authentication mechanism that makes use of, and in fact advantageously exploits, known "disadvantages" in the molding process to the benefit of the device and component manufacturer.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating and product processing environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in molding devices and according to molding processes of many different configurations, including modifiable characteristics. Embodiments according to this disclosure may be practiced in product processing environments where tasks are performed by local and remote devices that may, for example, remotely direct molding operations in particular molding devices, or otherwise remotely perform authentication processing according to the disclosed embodiments. Remotely-located devices and components may be linked to each other by hardwired links, wireless links, or a combination of both through a communication network. In a distributed computing environment, program modules may be located in both local and remote memory storage devices.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 4, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

I claim:

1. A method of identifying a molded product, comprising:
    imaging, with a surface imaging device, at least a portion of a surface of a molded product to detect at least one surface defect in the surface of the molded product, the molded product having been produced in a product molding process that intentionally introduces the at least one surface defect in the surface of the molded product;
    reading labeling on the molded product that includes generated identification information based on the at least one surface defect;
    comparing, with a processor, the imaged portion of the surface of the molded product with the generated identification information in the read labeling; and
    authenticating, with the processor, the molded product based on the comparing.

2. The method of claim 1, the at least one surface defect comprising at least one of undercut posts, flashes, weld lines, sinks, cracked ribs and flow marks.

3. The method of claim 1, the at least one surface defect and the labeling being located in a test portion of the molded product.

4. The method of claim 1, the surface imaging device being a camera.

5. The method of claim 4, the processor being associated with a wireless transceiver.

6. The method of claim 1, the labeling being at least one of integral to and affixed to the molded product.

7. The method of claim 1, the labeling being electronically included in an embedded active or passive radio transmission device or an RFID device.

8. The method of claim 1, the labeling including the generated identification information in an encrypted format, the method further comprising decrypting, with the processor, the generated identification information prior to the comparing.

9. The method of claim 1, the molded product being a replaceable component installed in a device for use, the processor being associated with the device within which the replaceable component is installed for use.

10. The method of claim 9, further comprising inhibiting, with the processor, device operation when the authenticating the molded product fails based on the comparing.

11. A system for authenticating a molded product in a device in which the molded product is installed for use, comprising:
    a surface imaging device that images at least a portion of a surface of a molded product installed in a device for use to detect surface defects in the molded product, the molded product having been produced in a product molding process that intentionally introduces at least one surface defect in the molded product,
    a reading device that reads labeling of the molded product that includes generated identification information based on the at least one intentionally introduced surface defect; and
    a processor that is programmed to compare the imaged portion of the surface of the molded product with the generated identification information in the read labeling, and to authenticate the molded product based on a result of the comparison.

12. The system of claim 11, the surface imaging device being a camera.

13. The system of claim 11, the labeling being at least one of mounted on or embedded within the molded product.

14. The system of claim 11, the labeling being in a form of an externally visually readable label, and the reading device being a component of the surface imaging device.

15. The system of claim 11, the labeling being in a form of an externally electronically readable device.

16. The system of claim 15, the externally electronically readable device being at least one of an active radio transmission device, a passive radio transmission device or an RFID device.

17. The system of claim 16, the reading device being a wireless transceiver.

18. The system of claim 11, the labeling including the generated identification information in an encrypted format, the processor being further programmed to decrypt the generated identification information prior to conducting the comparison.

19. The system of claim 11, the molded product being a replaceable component installed in a device for use, the processor being associated with the device within which the replaceable component is installed for use.

20. The system of claim 11, the processor being further programmed to inhibit device operations when the authenticating the molded product fails based on the result of the comparison.

* * * * *